United States Patent
Burczyk et al.

(10) Patent No.: US 8,960,717 B2
(45) Date of Patent: Feb. 24, 2015

(54) BELT STRAP FOR A SEATBELT OF A VEHICLE

(75) Inventors: Christian Burczyk, Stuttgart (DE); Uwe Merz, Stuttgart (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 13/990,857

(22) PCT Filed: Oct. 15, 2011

(86) PCT No.: PCT/EP2011/005188
§ 371 (c)(1),
(2), (4) Date: Aug. 13, 2013

(87) PCT Pub. No.: WO2012/072161
PCT Pub. Date: Jun. 7, 2012

(65) Prior Publication Data
US 2013/0320653 A1      Dec. 5, 2013

(30) Foreign Application Priority Data

Dec. 2, 2010    (DE) .......................... 10 2010 053 311

(51) Int. Cl.
*B60R 21/18*     (2006.01)
*B60R 21/2342*   (2011.01)

(52) U.S. Cl.
CPC ............. *B60R 21/18* (2013.01); *B60R 21/2342* (2013.01)
USPC ......... 280/733; 280/801.1; 297/473; 297/483

(58) Field of Classification Search
CPC .............................. B60R 21/18; B60R 21/201
USPC ............ 280/733, 728.1, 801.1, 808; 297/473, 297/483
See application file for complete search history.

(56) References Cited

U.S. PATENT DOCUMENTS

| | | | |
|---|---|---|---|
| 5,390,953 A | | 2/1995 | Tanaka et al. |
| 6,170,863 B1 * | | 1/2001 | Takeuchi et al. ............... 280/733 |
| 6,217,063 B1 * | | 4/2001 | Takeuchi ....................... 280/733 |
| 6,419,263 B1 * | | 7/2002 | Busgen et al. ................. 280/733 |
| 6,439,601 B1 * | | 8/2002 | Iseki .............................. 280/733 |
| 6,585,289 B1 * | | 7/2003 | Hammer et al. ............... 280/733 |

(Continued)

FOREIGN PATENT DOCUMENTS

| | | |
|---|---|---|
| DE | 43 26 499 A1 | 3/1994 |
| DE | 198 57 517 A1 | 6/2000 |

(Continued)

OTHER PUBLICATIONS

German-language Written Opinion (PCT/ISA/237) dated Jan. 16, 2012 (Six (6) pages).
International Search Report dated Jan. 16, 2012 with English translation (Five (5) pages).

*Primary Examiner* — Ruth Ilan
*Assistant Examiner* — Darlene P Condra
(74) *Attorney, Agent, or Firm* — Crowell & Moring LLP

(57) ABSTRACT

A seatbelt strap for a seatbelt of a motor vehicle includes several seatbelt strap layers and at least one belt interior that can be charged with gas and is arranged between at least two seatbelt strap layers. The seatbelt strap layers are connected to one another in the region of the chargeable seatbelt interior at edge regions by tear strips having different seam thicknesses in different sections. The seatbelt strap layers are fastened to one another outside a region of the chargeable seatbelt interior in such a way that these remain connected to one another at least during the charging of the seatbelt interior.

6 Claims, 2 Drawing Sheets

(56) References Cited

U.S. PATENT DOCUMENTS

Figure 1:
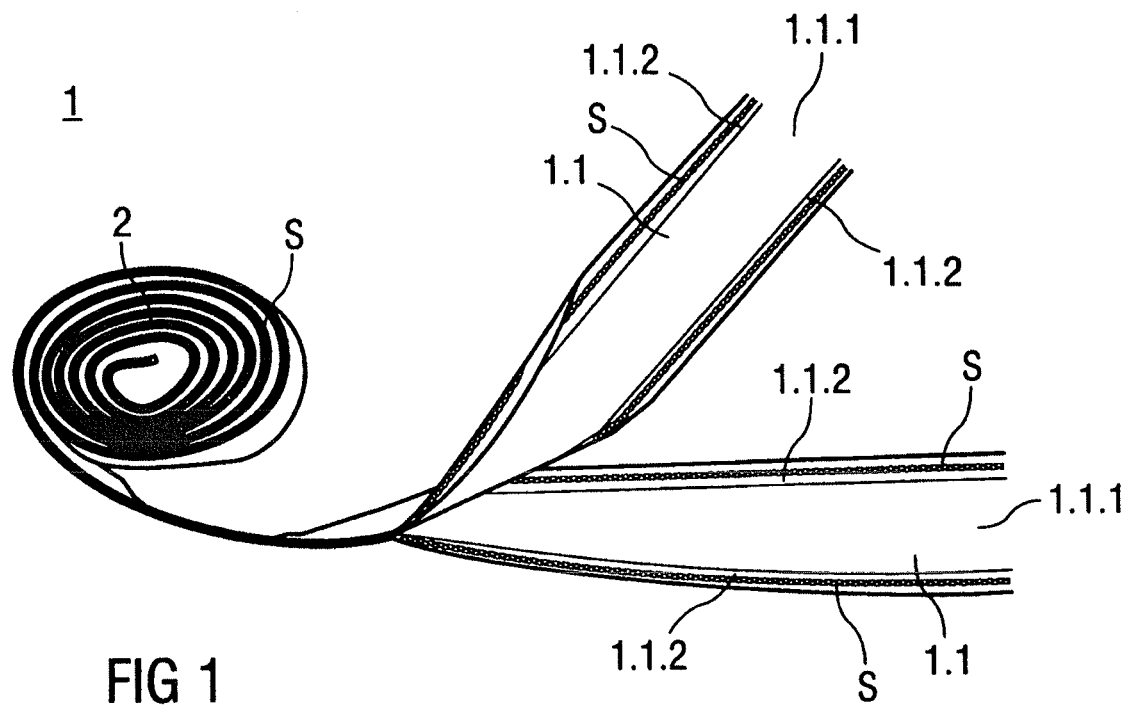

| | | | |
|---|---|---|---|
| 6,598,899 B2 * | 7/2003 | Stonich et al. | 280/733 |
| 6,698,790 B2 * | 3/2004 | Iseki et al. | 280/733 |
| 6,951,350 B2 * | 10/2005 | Heidorn et al. | 280/733 |
| 7,604,253 B2 * | 10/2009 | Nezaki et al. | 280/733 |
| 7,708,312 B2 * | 5/2010 | Kalandek | 280/733 |
| 2002/0125700 A1 * | 9/2002 | Adkisson | 280/733 |
| 2010/0164207 A1 * | 7/2010 | Sekizuka et al. | 280/733 |

FOREIGN PATENT DOCUMENTS

| | | |
|---|---|---|
| DE | 10 2010 023 874 A1 | 12/2011 |
| EP | 0 965 496 A1 | 12/1999 |
| WO | WO 99/65733 A2 | 12/1999 |

* cited by examiner

BELT STRAP FOR A SEATBELT OF A VEHICLE

BACKGROUND AND SUMMARY OF THE INVENTION

Exemplary embodiments of the present invention relate to a seatbelt strap for a seatbelt of a motor vehicle, having several seatbelt strap layers and at least one belt interior that can be charged with gas and is arranged between at least two seatbelt strap layers, wherein the seatbelt strap layers are connected to one another in the region of the chargeable seatbelt interior at edge regions by means of tear strips having different seam thicknesses in different sections.

A seatbelt strap for a seatbelt of a vehicle is disclosed in German Patent document DE 10 2010 023 874 A1. The seatbelt strap is folded in a Z-shape parallel to the longitudinal extension, wherein fold points are connected to one another at edge regions by means of tear strips. The tear strips in the edge regions each have sectionally different seam thicknesses, such that sections with a respective tearing seam with a different seam thickness are formed on each edge region.

Exemplary embodiments of the present invention provide a seatbelt strap for a seatbelt of a vehicle that is an improvement over the prior art.

A seatbelt strap for a seatbelt of a motor vehicle has several seatbelt strap layers and at least one belt interior that can be charged with gas and is arranged between at least two seatbelt strap layers, wherein the seatbelt strap layers are connected to one another in the region of the chargeable seatbelt interior at edge regions by means of tear strips having different seam thicknesses in different sections. According to the invention, the seatbelt strap layers are fastened to one another outside a region of the chargeable seatbelt interior in such a way that these remain connected to one another at least during the charging of the seatbelt interior.

This means that the seatbelt strap layers are fastened to one another in such a way that a bonding force operates more strongly than a tearing force during the charging of the seatbelt interior with the gas.

A separation of the seatbelt strap layers is prevented or at least reduced at least during the charging of the seatbelt interior beyond this region by means of the seatbelt strap according to the invention.

A seatbelt strap edge is thus fastened, whereby the resistance of the seatbelt strap is increased in the region outside of the chargeable seatbelt interior.

Exemplary embodiments of the invention are illustrated in greater detail with the aid of figures.

BRIEF DESCRIPTION OF THE DRAWING FIGURES

Figure 2:
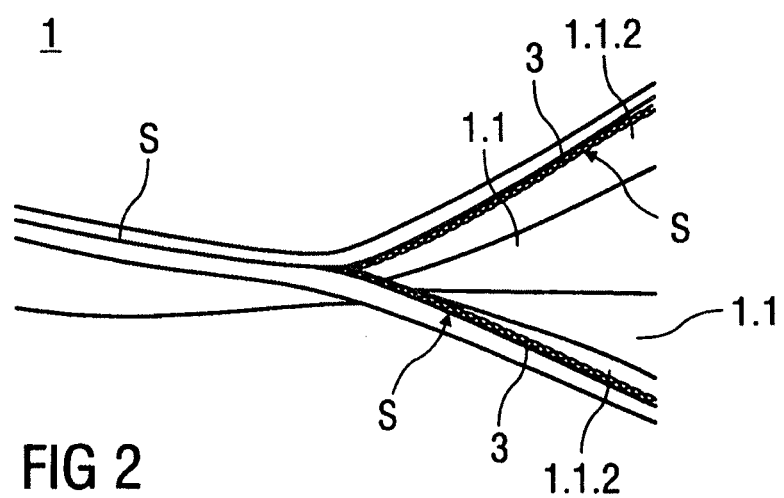
Figure 3:
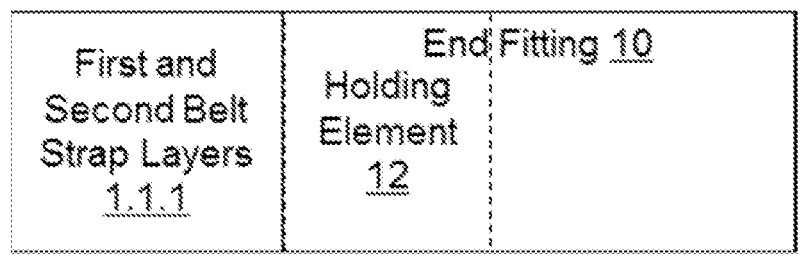

The following can be seen in the figures:

FIG. 1 schematically, in a perspective view, a coiled seatbelt strap with a tearing seam introduced in the region of a chargeable seatbelt interior and with a stop seam introduced outside the region, FIG. 2. schematically, in a perspective view, a transfer region between the tearing seam and the stop seam, and FIG. 3. highly schematically, an end of first and second layers of seatbelt strap layers fastened on a holding element of an end fitting.

Parts that correspond to one another have the same reference numerals added to them in all figures.

DETAILED DESCRIPTION

FIG. 1 shows a seatbelt strap 1 for a seatbelt of a vehicle. The seatbelt strap 1 comprises two seatbelt strap layers 1.1, which are arranged extensively congruently to each other during the arrangement of the seatbelt strap 1 in the vehicle. Here, the ends 1.1.1, which are fastened to an end fitting (not depicted in FIG. 1) of the seatbelt, which is arranged on a vehicle body, are depicted as separate from one another. As illustrated in FIG. 3, the ends 1.1.1 of the first and second seatbelt strap layers 1.1 are arranged on an end fitting 10, and more specifically these ends 1.1.1 are fastened to a holding element 12 of the end fitting 10.

A seatbelt interior, which is not depicted in greater detail, is formed in a predetermined region of the seatbelt strap 1 between the seatbelt strap layers 1.1, which can be charged with a gas of a gas generator (not shown). To that end, the gas generator is arranged on the end fitting of the seatbelt. Due to the charging of the seatbelt interior with the gas, for example air or a reaction gas, which is produced by activating a pyrotechnic gas generator, the seatbelt strap 1 is uncoiled and inflates, such that a bearing surface of the seatbelt strap 1 is increased, wherein the increased seatbelt strap 1 rests against a body of a vehicle passenger like an air hose.

Here, the seatbelt interior is charged with the gas when a collision or impending collision of the vehicle is detected.

An uncoiling direction of the seatbelt strap 1 is provided by means of a tearing seam 2 introduced into an edge region 1.1.2 of the seatbelt strap layers 1.1 arranged on top of one another, which has, in sections, a different seam thickness. Moreover, the seatbelt strap layers 1.1, in the non-charged status of the seatbelt interior, are fastened to one another by means of the tear strips, which are introduced as a tearing seam 2 into the edge region 1.1.2.

To avoid the seatbelt strap layers 1.1 being released from each other outside a region of the seatbelt interior charged with the gas, provision is made according to the invention for the seatbelt strap layers 1.1 to be attached to each other with their edge regions 1.1.2 in such a way that a bonding force between the seatbelt strap layers 1.1 operates more strongly than a tearing force during the charging of the seatbelt interior.

For this, a number of seams 3, which are not depicted in FIG. 2, are introduced into the edge region 1.1.2 of the seatbelt strap layers 1.1, which is denoted as a stop seam S, whereby the seatbelt strap 1 is reinforced in the edge region 1.1.2. Here, the stop seam S is introduced exclusively into a predetermined region of the edge region 1.1.2, such that a channel is formed outside the chargeable seatbelt interior. This channel serves as a supply line to feed the gas coming from the gas generator into the chargeable seatbelt interior.

As an alternative to this, a separate supply line, for example a hose, can be arranged in the channel, by means of which the gas can be transported from the gas generator to the chargeable seatbelt interior.

As an alternative to introducing the number of seams 3 as stop seam S into the edge region 1.1.2 of the seatbelt strap layers 1.1, these are interwoven with one another in the predetermined region of the edge region 1.1.2, such that the bonding force between the seatbelt strap layers 1.1 is secured.

A fastening of the seatbelt strap edge is thus increased, whereby the seatbelt strap layers 1.1 remain connected to one another at least during the charging of the seatbelt interior. Furthermore, the seatbelt strap edge fastening reduces abrasion of the seatbelt strap 1 in the edge region 1.1.2.

An end 1.1.1 of the seatbelt strap layer 1.1 is fastened to a non-depicted holding element of the end fitting. The end fitting is thus connected to the vehicle body, wherein the end fitting is in turn connected to the seatbelt strap 1. The seatbelt strap layers 1.1 are preferably held for rotational movement on the holding elements of the end fitting, wherein a fluidic connection to the gas generator is secured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A seatbelt strap for a seatbelt of a vehicle, comprising:
   first and second seatbelt strap layers; and
   at least one belt interior configured to be charged with gas from a gas generator and arranged between the first and second seatbelt strap layers,
   wherein in a region of the chargeable seatbelt interior the first and second seatbelt strap layers are connected to one another at edge regions by tear strips having different seam thicknesses in different sections,
   wherein the first and second seatbelt strap layers are fastened to one another outside a region of the chargeable seatbelt interior by stop seams in the edge regions that are configured in such a way that the first and second seatbelt strap layers remain connected to one another at least while the belt interior is being charged, and
   wherein the stop seams form a channel, which is outside of the chargeable seatbelt interior, configured to supply the gas from the gas generator to the chargeable seatbelt interior.

2. The seatbelt strap according to claim 1, wherein an end of the first and second seatbelt strap layers are arranged on an end fitting, which is fastened to a vehicle body.

3. The seatbelt strap according to claim 2, wherein the end of the first and second seatbelt strap layers is fastened to a holding element of the end fitting.

4. A seatbelt, comprising:
   a seatbelt strap that includes
      first and second seatbelt strap layers; and
      at least one belt interior configured to be charged with gas from a gas generator and arranged between the first and second seatbelt strap layers,
   wherein in a region of the chargeable seatbelt interior the first and second seatbelt strap layers are connected to one another at edge regions by tear strips having different seam thicknesses in different sections,
   wherein the first and second seatbelt strap layers are fastened to one another outside a region of the chargeable seatbelt interior by stop seams in the edge regions that are configured in such a way that the first and second seatbelt strap layers remain connected to one another at least while the belt interior is being charged, and
   wherein the stop seams form a channel, which is outside of the chargeable seatbelt interior, configured to supply the gas from the gas generator to the chargeable seatbelt interior.

5. The seatbelt according to claim 4, wherein an end of the first and second seatbelt strap layers are arranged on an end fitting, which is fastened to a vehicle body.

6. The seatbelt strap according to claim 5, wherein the end of the first and second seatbelt strap layers is fastened to a holding element of the end fitting.

* * * * *